United States Patent
Gerber et al.

(10) Patent No.: US 8,464,527 B2
(45) Date of Patent: Jun. 18, 2013

(54) FLOAT FOR WAVE ENERGY CONVERTER (WEC)

(75) Inventors: James S. Gerber, St. Paul, MN (US); Christopher Thomas Phelan, Philadelphia, PA (US); Wei Qiu, St. John's (CA); Donald Smith Spencer, Torbay (CA)

(73) Assignee: Ocean Power Technologies, Inc., Pennington, NJ (US)

( * ) Notice: Subject to any disclaimer, the term of this patent is extended or adjusted under 35 U.S.C. 154(b) by 746 days.

(21) Appl. No.: 12/592,108

(22) Filed: Nov. 19, 2009

(65) Prior Publication Data

US 2010/0126164 A1      May 27, 2010

Related U.S. Application Data

(60) Provisional application No. 61/199,881, filed on Nov. 21, 2008.

(51) Int. Cl.
*F03B 17/02* (2006.01)
*F03B 13/18* (2006.01)

(52) U.S. Cl.
USPC .................. 60/495; 60/497; 60/502

(58) Field of Classification Search
USPC ............... 60/495–507; 290/53.42; 441/1
See application file for complete search history.

(56) References Cited

U.S. PATENT DOCUMENTS

| | | | | |
|---|---|---|---|---|
| 3,803,540 A | * | 4/1974 | Mar et al. | 367/4 |
| 5,188,550 A | * | 2/1993 | Oliver | 441/1 |
| 5,440,903 A | * | 8/1995 | Kropf et al. | 68/134 |
| 6,604,478 B2 | * | 8/2003 | Barsumian | 114/67 A |
| 6,768,216 B1 | * | 7/2004 | Carroll et al. | 290/42 |
| 6,768,217 B2 | * | 7/2004 | Chalmers et al. | 290/53 |
| 6,863,806 B2 | * | 3/2005 | Stark et al. | 210/170.05 |
| 7,258,532 B2 | * | 8/2007 | Welch et al. | 417/333 |
| 8,099,804 B2 | * | 1/2012 | Gregg | 4/498 |
| 2007/0068153 A1 | * | 3/2007 | Gerber | 60/497 |
| 2007/0266704 A1 | * | 11/2007 | Bull et al. | 60/398 |
| 2010/0224114 A1 | * | 9/2010 | Coppens | 114/61.13 |
| 2011/0009019 A1 | * | 1/2011 | Neira et al. | 441/1 |
| 2011/0089689 A1 | * | 4/2011 | Gregory | 290/42 |

* cited by examiner

*Primary Examiner* — Thomas Denion
*Assistant Examiner* — Brian Inacay
(74) *Attorney, Agent, or Firm* — Henry I. Schanzer (57) ABSTRACT

A float structure for a WEC is designed to have a tapered underside to reduce the impact due to wave slam and bending moments while providing little reduction in the surface area responding to the wave surface in order to maintain the beneficial power generating capability of a "flat" float. The underside of the float presents an inverted wedge section to decrease loads associated with wave slamming. The float may have a generally toroidal or elliptical configuration at and about the "still" water line with the generally submerged underside of the float having a cross section shaped to have one or more inverted triangular sections extending between the outer perimeter of the float and its center to reduce impact loading due to wave slamming while maintaining power producing capability.

18 Claims, 11 Drawing Sheets

FLOAT FOR WAVE ENERGY CONVERTER (WEC)

This invention claims priority from provisional application Ser. No. 61/199,881 filed Nov. 21, 2008 for FLOAT FOR WAVE ENERGY CONVERTER (WEC) whose teachings incorporated herein by reference.

BACKGROUND OF THE INVENTION

This invention relates to apparatus for converting energy present in surface waves of bodies of water into useful electrical energy and, in particular, to the design of floats (or shells) for use in wave energy converters (WECs) to improve the power generation efficiency and survivability of the WECs.

Various wave energy converter (WEC) systems are known. For example, reference is made to U.S. Pat. No. 6,921,904 titled "Wave Energy Converter Utilizing Pressure Difference"; U.S. Pat. No. 6,617,705 titled "Protector Arrangement For Natural Energy Power Generation Systems" and U.S. Pat. No. 7,141,888 titled "Antirotational Structures For Wave Energy Converters" all assigned to the assignee of the present application, and the teachings of which are incorporated herein by reference.

Known WEC systems generally include a "float" (or "shell") and a "spar" (or "shaft" or "column" or "piston") which are designed to move relative to each other to convert the force of the waves into mechanical energy. In these systems, the float is generally depicted or referred to as the moving member and the spar as the non-moving or mechanically grounded member. But, the opposite may be the case. Alternatively, the spar and float may both move relative to each other.

Figure 1:
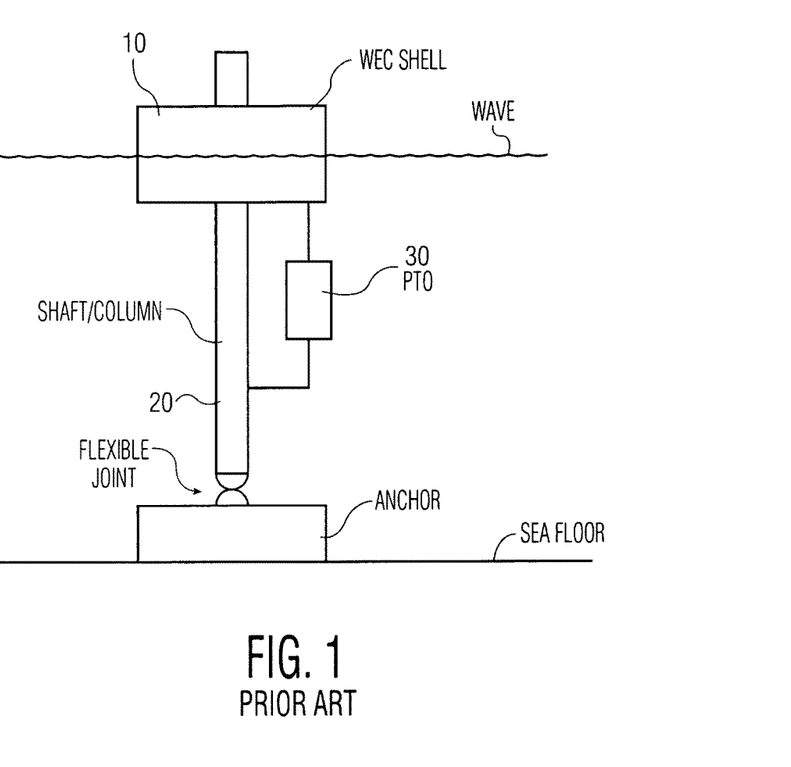
FIG. 1 is a highly simplified cross-sectional diagram of a prior art WEC.
Figure 1A:
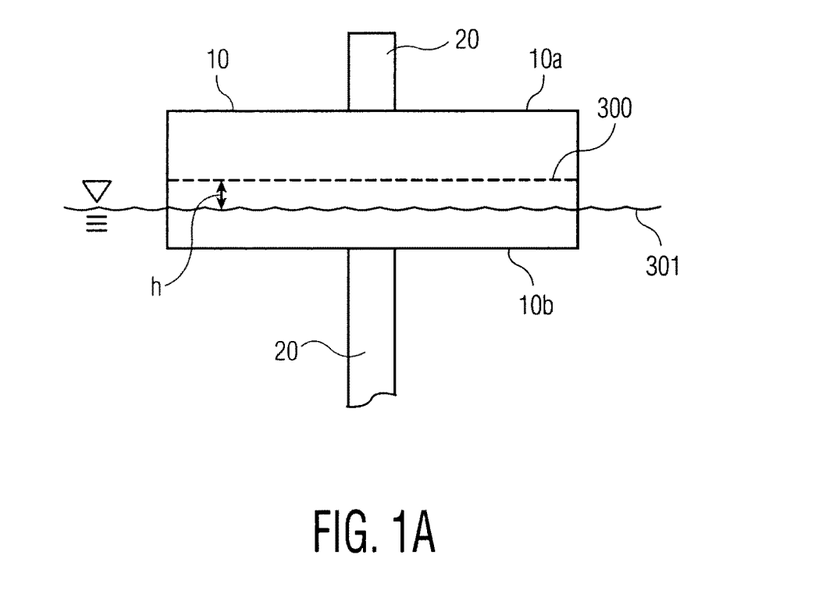
FIG. 1A is a simplified cross-sectional diagram of a prior art float designed for maximum power production.

As shown in FIGS. 1 and 1A, a WEC generally includes a float 10 (also referred to as a shell) and a spar 20 (also referred to as a shaft or column), which are intended to move relative to each other in response to the waves, and a power-take-off device (PTO) 30 coupled between the float and spar to convert their relative motion into a useful form of energy. The PTO device may be any device capable of converting the relative motion between the float and spar into electrical energy or mechanical energy (e.g., performing some other type of useful work such as desalinating seawater).

In general, to obtain the most power efficient system, it is desirable that the float 10 of the WEC be designed such that the displaced volume of the float is preferentially located close to the waterplane of the float. The neutrally buoyant or water plane of a float, represented by dashed line 300, may be defined as the "still water level" of the float in the absence of action by the PTO. The water surface plane 301 is intended to show the instantaneous water level. For example, FIG. 1A shows the top surface 10a and bottom surface 10b of the float 10 to extend in a horizontal direction, parallel to each other, and both surfaces have essentially the same diameter and surface area. This generally flat bottom structure of the float provides good power generating efficiency because wave-induced hydrodynamic force, (which may be approximated as the change in buoyant force), is what enables power generation. The change in the buoyant force on an object is defined as $\rho g \Delta V$, where $\rho$ is the density of water, $g$ is the acceleration due to gravity, and $\Delta V$ is the change in displaced volume; where displaced volume of a body is defined as, and refers, to the volume of the portion of said body that is below the instantaneous water surface 301. For small displacements of the water surface 301 where the water surface is displaced by a distance $h$ from the water plane, the change in displaced volume $\Delta V$ is $hA$, where $A$ is the waterplane area.

A problem with the floats shown in FIGS. 1 and 1A is that its extended flat ("pancake") bottom surface is subjected to "wave slamming events" which may also be referred to as "water slamming". For example, if the bottom of the float is lifted above the water surface due to large waves, or any other cause, when the float drops and hits the water surface, the flat bottom will be subjected to large impact forces which threaten the survivability of the float.

In addition, the float may be subjected to dangerous bending moments. For example, if a large force (due to water impact) acts on the bottom of the float near the outer edge of the float, the effective lever arm (to the central point of the float) will be the float radius. A large impact force on the bottom of the float, acting with the full float radius as a lever arm, may lead to a dangerous bending moment (force times distance) on the float-spar connection mechanism.

Thus, to increase the survivability of the float and to keep it safe from wave slam, it is undesirable for the float to present a large surface area that is substantially flat or substantially horizontal to the water surface.

Figure 2:
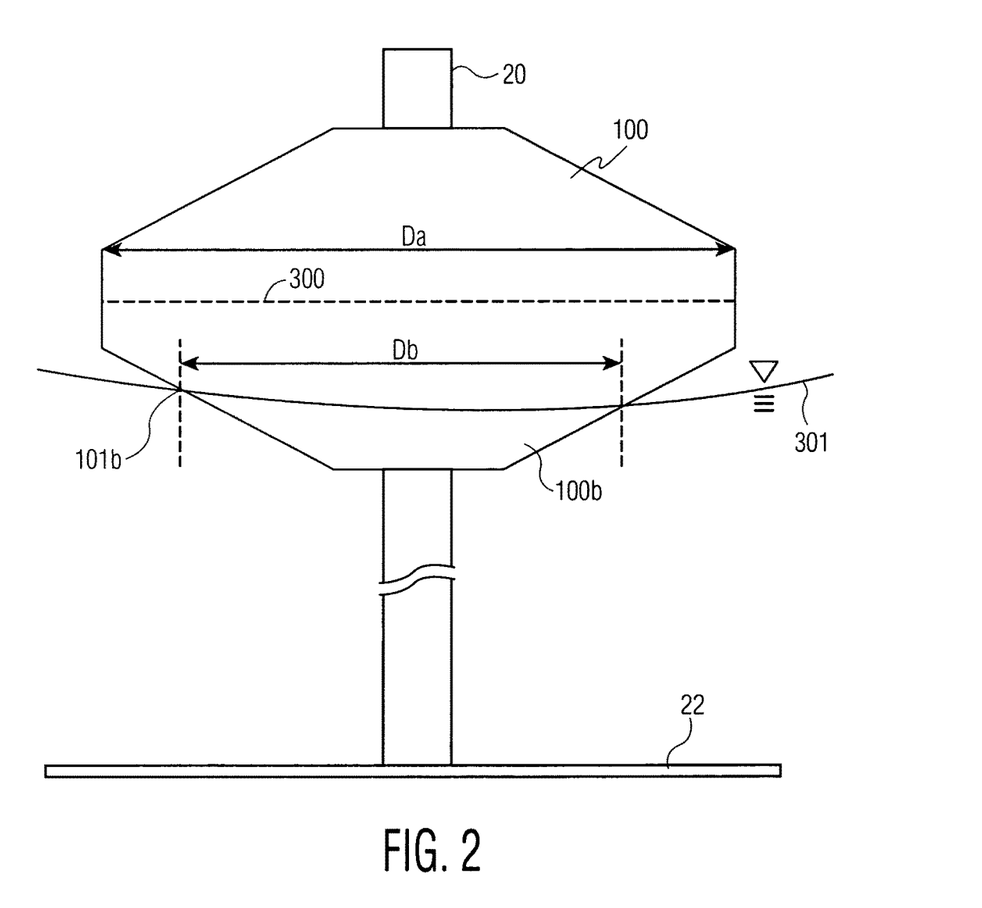
FIG. 2 is a simplified cross-sectional diagram of a prior art float with an inverted truncated cone underside providing limited survivability with decreased power generation capability.

Referring to FIG. 2, there is shown a float 100 having an underside 100b whose cross section is shaped like an inverted truncated cone or triangle. A line 300 indicates the waterplane of the float and a line 301 represents the surface of a wave. In response to waves, float 100 moves up and down relative to a spar 20 which may be terminated at its lower submerged end with a heave plate 22. [Although not explicitly shown in all the figures, a spar 20 used to practice the invention may be generally anchored, as shown in FIG. 1, or connected to a heave plate as shown in FIG. 2. Also, in WECs embodying the invention, a PTO is coupled between a float and a spar as shown in FIG. 1, although not shown in the remaining figures.] The float 100 is designed to reduce the problem of "wave slam". However, the single inverted truncated cone shaped water-displacing portion of float 100 is not optimized with regard to the requirement for producing maximum power. This is demonstrated in FIG. 2 by showing that the effective area of the float capable of responding to the waves has decreased from Da to Db. That is, the effective area of the submerged portion of the float will be a function of the surface area at 101b. For the truncated cone, the surface area to be acted upon by surface wave 301 would (neglecting the central opening for the shaft) be approximately $$\pi\left(\frac{D_b}{2}\right)^2,$$

where $D_b$ is the diameter of the underside below the water line and along the wave front. For the flat bottomed toroid the surface area at 101a would be approximately $$\pi\left(\frac{D_a}{2}\right)^2,$$

where $D_a$ is the diameter at and above the water line. Thus, although the truncated cone shaped float, shown in FIG. 2, functions to decrease loads associated with slamming, the inverted truncated cone underside has the disadvantage of providing less buoyant-force response for small waves and only limited protection against wave slamming.

Thus there exists a problem of producing a float with increased survivability and satisfactory power generating capability. This problem is addressed in accordance with floats embodying the invention.

SUMMARY OF THE INVENTION

The present invention relates to the design of a float structure for a WEC which enhances protection against wave slam and excessive bending moments and at the same time maintains the beneficial power generating capability of a "flat" float.

The outer perimeter of the underside of a float embodying the invention is generally tapered and is shaped to have a cross-section which may be represented as having one or more or triangular sections. The underside of the float thus presents one or more triangular structures, or "wedges" such that the underside of the float "cuts" through the water surface rather than coming down flat onto the water surface. Moreover, this structure provides flexibility of design to enable power generation comparable to a flat float.

A float embodying the invention may have a generally toroidal configuration (e.g. be doughnut-shaped) along the horizontal direction at and about the "still" water line and the generally submerged underside of the float having a cross section shaped to have one or more inverted triangular sections extending between the outer perimeter of the float and its center which reduce impact loading due to wave slamming while maintaining preferred displaced volume and power producing characteristics.

Vent holes may be formed extending vertically through the float at points generally selected near the base of adjacent triangular sections to enable fluids (e.g., air) trapped below the float to pass through the float and thereby reduce the development of high-pressure regions which can lead to large loads on the float.

For special purposes the upper portion of the float may also be tapered.

BRIEF DESCRIPTION OF THE DRAWINGS

In the accompanying figures which are not drawn to scale, like reference characters denote like components.

DETAILED DESCRIPTION OF THE INVENTION

A solution embodying the invention, aimed at reducing the impact of water slamming while maintaining power production includes a float for a WEC, where the underside of the float, intended to be impacted by the waves, is wedge shaped (e.g., it is triangular in cross section with the apex of the triangle pointing away from the top surface of the float).

Figure 3:
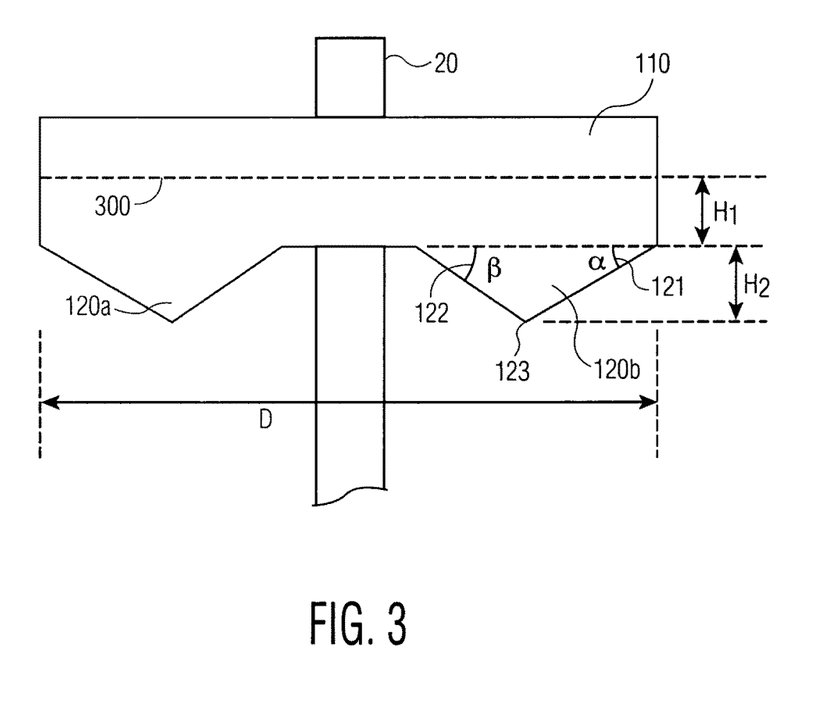
FIG. 3 is a simplified cross-sectional diagram of a float with a wedge-shaped underside embodying the invention.
Figure 4A:
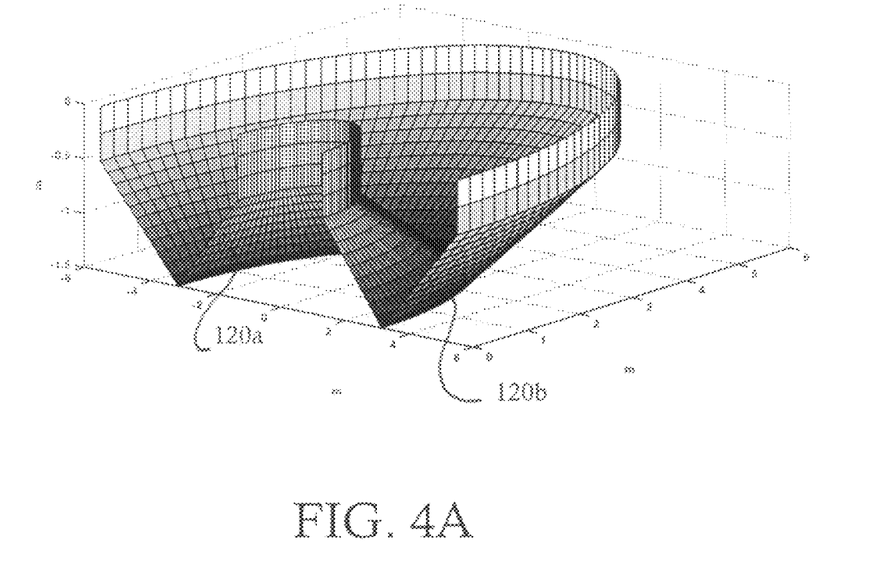
FIGS. 4A and 4B are isometric diagrams showing two different views of a toroidal float embodying the invention corresponding to a float of the type shown in FIG. 3.
Figure 4B:
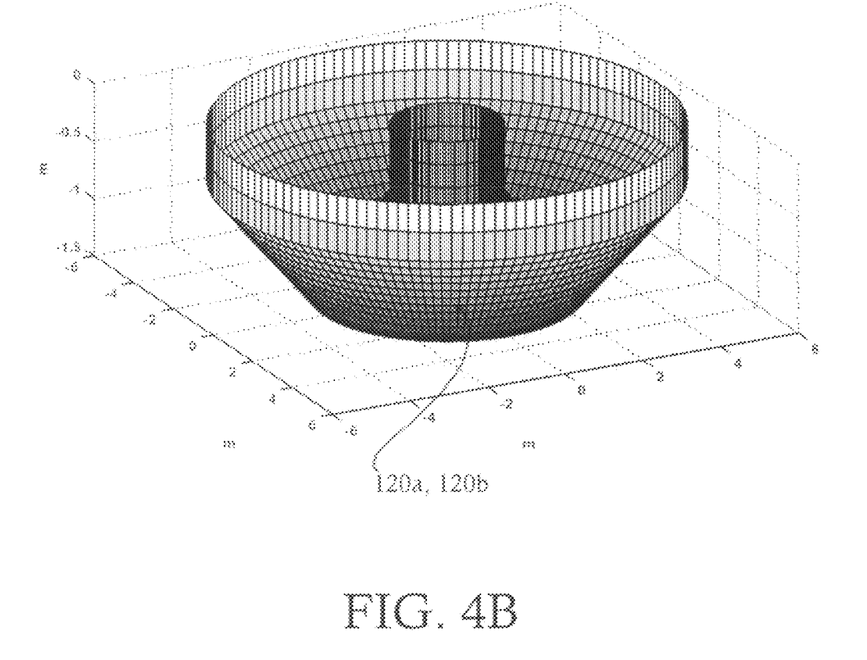

FIGS. 3, 4A and 4B show a float 110 embodying the invention which has a central opening so the float can move up and down relative to a central shaft or spar 20. FIGS. 4A and 4B are different isometric views of the top and underside of the float whose cross section, as shown in FIG. 3, may be represented as having two triangular/wedge sections, 120a, 120b. The float 110 extends radially and symmetrically about the shaft 20 which defines a central axis of symmetry of the WEC. The float 110 has: (a) an upper section having a toroidal configuration, of height H1, with the toroid extending along the horizontal (x) direction (the surface of the "still" water); and (b) an underside section whose cross section includes a triangular section (represented by 120a, 120b), extending from the underside of the top section of the float. The altitude (height) of the triangular sections is shown as H2, in FIG. 3. The toroidal triangular section, or sections, if more than one, lies, generally, below the water plane 300.

The triangularly shaped sections on the underside of the float function to break (and redistribute) the wave slamming forces applied to the float when moving up and down in response to the waves. The triangular, or "wedge," edge of the float's underside tends to cut through the water (and water surface) reducing resistance to the entry of the bottom of the float into the water. This advantage is obtained without significantly reducing the power generating capability of the float.

Note that the underside of the float made in accordance with the invention also reduces the problem of the bending moment mentioned above. By way of example, a toroidal float 110, shown in FIG. 3, may have a diameter (D), which may range from less than 5 meters to more than 15 meters, a first section below the waterline 300 extending to the base of triangular section 120a of height, H1, which may range from less than ½ meters to more than 1 meter and a toroidal triangular cross section (120a, 120b) whose altitude, height or depth (H2) may range from less than ½ meter to more than 2 meters. These dimensions are for purpose of illustration only and in actuality may be substantially decreased or increased.

Provided that the height H1 is sufficiently large, the power generating capability of the float is not significantly reduced because in the vicinity of the waterplane 300, the float is a right circular cylinder with a height of at least H1 below the waterplane. Thus, if the distance h between the water (wave) surface 301 and the waterplane 300 is less than H1, the displaced volume of the float is A*h, where A is the waterplane area of the float. By contrast, using a truncated cone shaped float of the type shown in FIG. 2, the displaced volume in this situation would be less and hence the buoyant force and the power generating capability would be less.

Referring to FIG. 3 (which is a simplified cross sectional diagram of FIGS. 4A and 4B), the "cutting edge" 121 of the triangular structure is shown to make an angle α with respect to the base and the "cutting edge" 122 is shown to make an angle β with respect to the base, with the two cutting edges meeting at a point 123 defining the apex of the triangle. By way of example, note that the angle α (See FIG. 3) may be made to vary from a value of 90°, to some very small value (with the angle β varying as required to meet corresponding geometric constraints). If the angle α is made very small (i.e., of a few degrees) then the benefits of the wedged underside to increase survivability are reduced, as the effect of the wedge becomes negligible. If the angle α is increased substantially (made to approach 90°) a substantial amount of material is added to the structure increasing the weight of the float without commensurate benefit to increasing the power production. Also, the inner underside surface of the wedge increases in size resulting in an undesirably large underside surface which is prone to slam loads.

Figure 6:
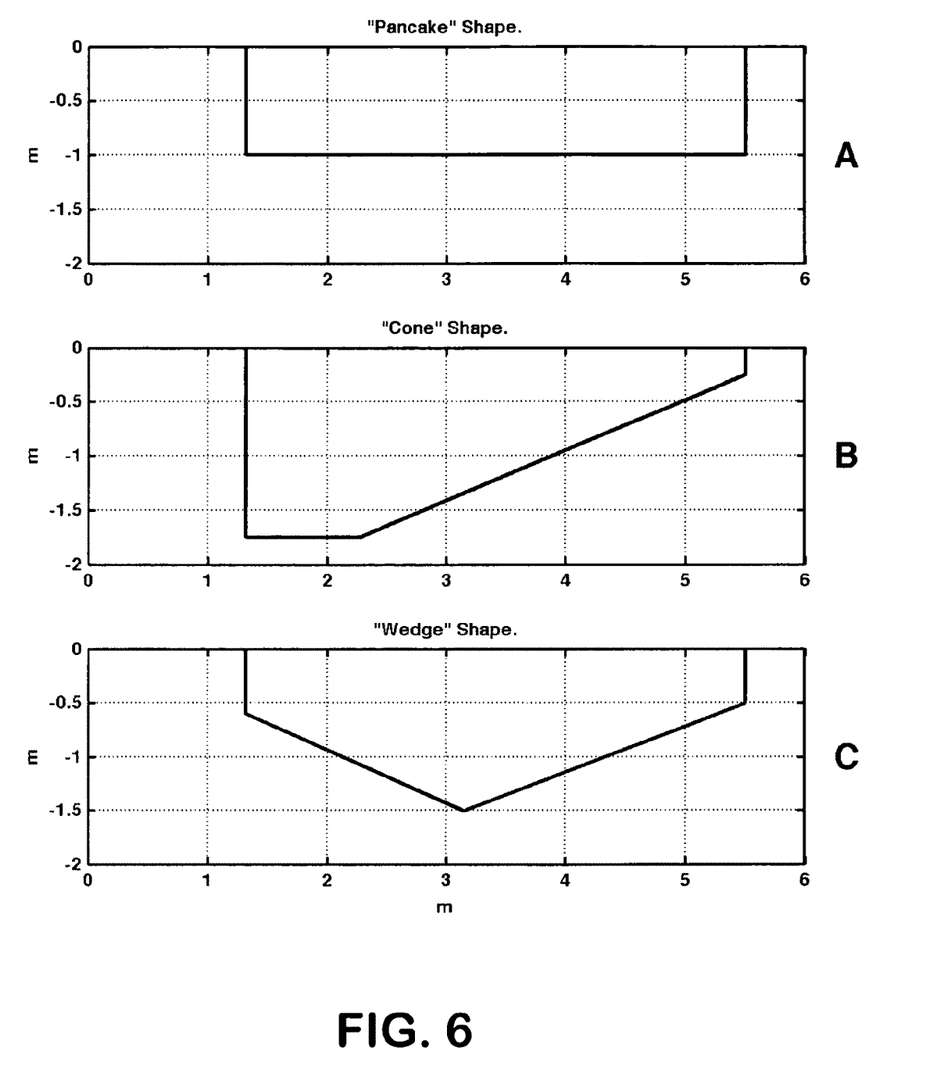
FIG. 6 includes: (a) a cross-sectional diagram of a section A which when rotated 360 degrees about a central vertical axis sweeps out the shape a toroidal pancake-shaped float in accordance with the prior art; (b) a cross-sectional diagram of a section B which when rotated 360 degrees about a central vertical axis sweeps out the shape a toroidal truncated-cone-shaped float in accordance with the prior art; and (c) a cross-sectional diagram of a section C which when rotated 360 degrees about a central vertical axis sweeps out the shape a toroidal wedge-shaped float in accordance with the invention.

Various aspects of the invention discussed above may be illustrated and summarized with respect to FIG. 6 which illustrates that: (a) rotating the section A shown in FIG. 6 by 360 degrees about a central vertical axis produces a flat bottom (pancake) toroidal float; (b) rotating the section B shown in FIG. 6 by 360 degrees about a central vertical axis produces a truncated cone shaped toroidal float; and (c) rotating the section C shown in FIG. 6 by 360 degrees about a central vertical axis produces a toroidal float having a "wedged" underside, in accordance with the invention.

For ease of comparison, the three float sections A, B and C shown in FIG. 6 have been drawn to have equal displaced volumes of 89.6 m$^3$. For a very small (e.g. less than 0.25 m) vertical motion of a wave relative to the waterplane area of the floats, the change in displaced volume is the same for all three floats. However, for a larger vertical motion of a wave relative to the waterplane area of the floats, the change in displaced volume is different. To give a specific example, if the vertical motion of the wave surface relative to the waterplane area of the float is 1 m (so that the water surface is 1 m below the waterplane area) then the change in displaced volume for the three floats is as follows: the change in displaced volume for the "pancake" float is 89.6 m$^3$, the change in displaced volume for the "cone" float is 70.8 m$^3$, and the change in displaced volume for the "toroidal Wedge" is 78.6 m$^3$. This change in displaced volume is directly related to the force response. The "pancake" float has the largest force response for displacements of this height. The "toroidal wedge" float has a better force response than the truncated "cone" float for displacements of this height and better survivability characteristics.

Note that the underside of the float made in accordance with the invention also reduces the problem of the bending moment mentioned above. It is evident from inspection that the toroidal wedge provides the smallest surface against which an impact can act. This provides benefits, for it limits the overall magnitude of an impact force. An additional benefit is the decrease in moments about the connection point (see point 400 in FIGS. 8A and 8B) for the wedge relative to the case for the flat bottom float.

Applicants recognized the need to take several competing factors into account to design an optimally shaped wedge. When the altitude, [height or depth, (H2) as shown in FIG. 3] of the wedge is too small the resulting floating float may not be adequately protected from slam loads. However, if the height H2 of this wedge is too large, then the overall displaced volume of the float may also be too large, and the added weight necessary to achieve the structure may lead to unacceptably high construction costs.

An optimal value for the characteristics of the one or more triangular wedges may be determined by balancing these factors in a way which minimizes the total cost of useful energy produced by the device. It is desirable to have H1 large enough so that a substantial proportion of waves will lead to a relative vertical displacement between instantaneous wave surface and waterplane area of less than H1, thus providing maximal buoyancy force leading to maximal power conversion potential. However, as H1 is made bigger, the mass of the float increases which leads to an increase in construction costs, both direct (due to the materials of the float itself) and indirect (due to increased requirements on supporting systems for the float, such as bearing rails and braking devices). There are also tradeoffs when selecting the height H2. It is desirable to increase H2, because the sharper the angle of the wedge, the greater the decrease in the loads, leading to a decrease in construction costs. However, as H2 gets large, the mass of the float (due to the additional structural material) increases, leading to an increase in construction costs. For different values of D, H1, and H2 and the angles α and β of the triangular sections, the response of a float and the corresponding WEC system may be simulated. It is also possible to simulate the response of a WEC system and the cost to build, for a variety of values of H1 and H2, to determine the economies of an optimal float shape.

Figure 8A:
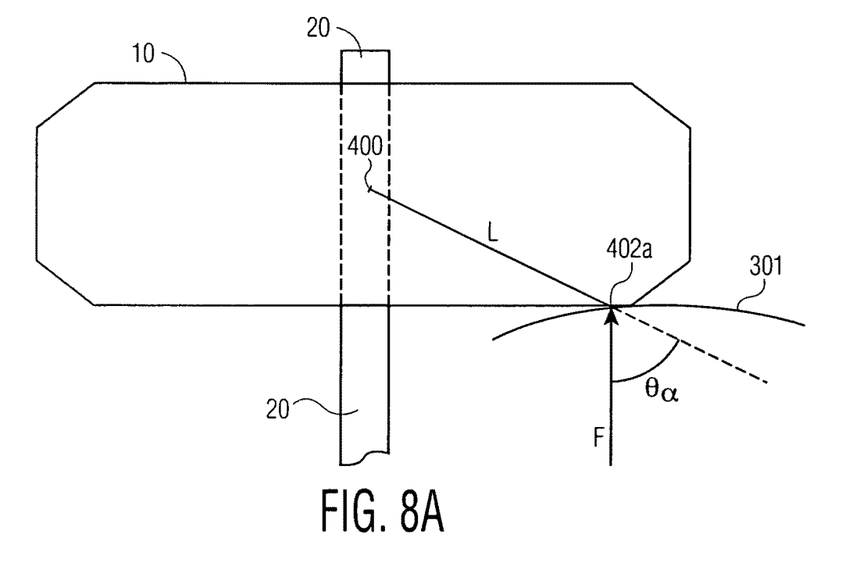
FIGS. 8A and 8B are respective cross sectional diagrams illustrating the application of forces to a prior art float and to a float embodying the invention, and the effect of these forces on the floats.
Figure 8B:
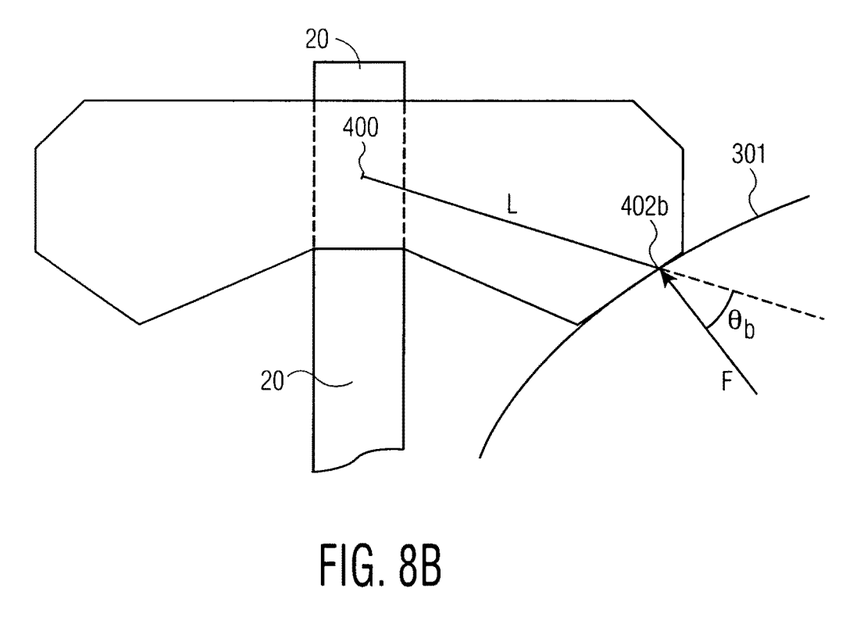

The effectiveness of floats embodying the invention to decrease impact loading may be illustrated with reference to FIGS. 8A and 8B. FIG. 8A shows a loading diagram for a flat bottom float impacting the water surface. FIG. 8B shows the loading for a float embodying the invention. It is noted that impact forces due to water entry events are in effect caused by regions of very high pressure. These pressure forces act in a direction normal (locally perpendicular) to the surface of a body. FIG. 8A shows a float 10 on a spar 20 being impacted by the water surface 301 at an impact point 402a. The float-spar connection point 400 is a distance L away from the impact point 402a. The formula for the torque T applied to the float-spar connection 400 due to an impact-induced force is T=FL sin(θ); where: (a) F is the impact force; (b) L is the distance from the float-spar connection point 400 to the point 402a at which the force F acts, and (c) $θ_a$ is the angle between the line from 400 to 402a and a line perpendicular to the surface of the float 110 at the impact point 402a. By comparison, FIG. 8B shows the application of the impact force (F) at a point 402b. It is evident that the angle $θ_b$ for the toroidal wedge of FIG. 8B is smaller than the angle $θ_a$ shown for the case of a "pancake" (flat-bottomed) float of FIG. 8A. Since the angle $θ_b$ is smaller, the sine of angle $θ_b$ is smaller than the sine of $θ_a$, and the resulting torque T at the float-spar connection point is also smaller. This shows that a float with a wedge bottom as per the invention leads to decreased loading and bending moments on the WEC.

Figure 5A:
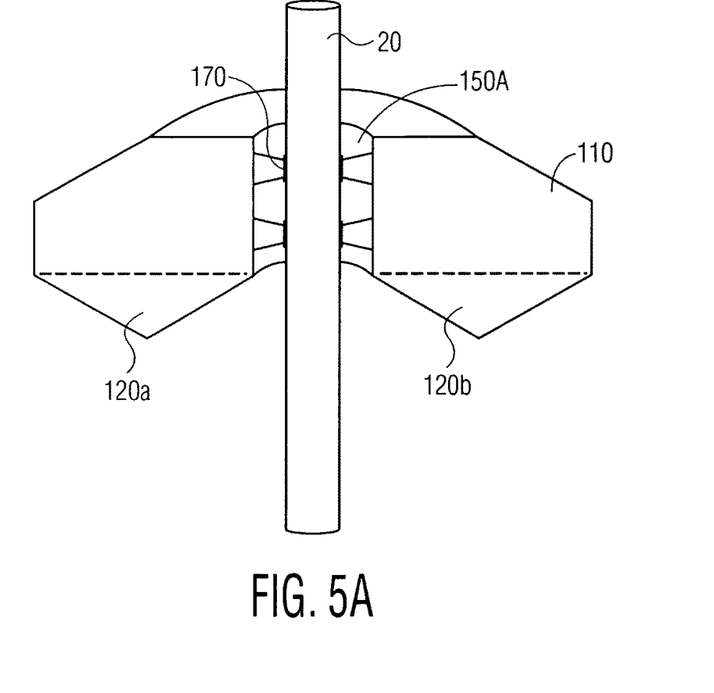
FIG. 5A is a cross-sectional diagram of a float embodying the invention with a venting space.

FIG. 5A shows the float 110 and spar 20 of FIG. 3 with a venting space 150A, between the float and the spar. An important feature of the invention is the inclusion of venting spaces 150A between the float and spar which enable trapped air, or water, to escape from the underside of the float in the event of a slam event. The escaping air, or water, will have the effect of diminishing the slam pressure, leading to decreased loads on the float. Bearing mechanisms 170 are also indicated. These bearing mechanisms 170 have the property of allowing air or water to pass to relieve pressure when the float is moving up or down.

Figure 5B:
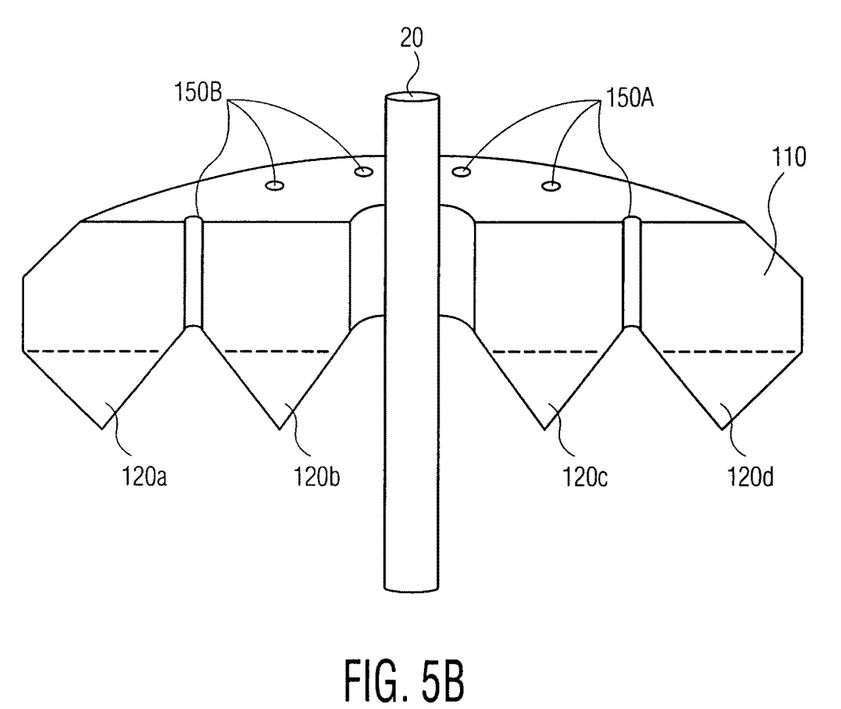
FIG. 5B is a cross-sectional diagram of a "double crested" float embodying the invention with vent holes and a venting space.

FIG. 5B shows the float 110 with several triangular wedges (120a, 120b, 120c, 120d) attached to the underside of the float 110 and/or formed as part of the underside of the float. In FIG. 5B there is shown a vent space 150A and numerous vent holes 150B which extend vertically through the float (between the top and bottom surfaces). The vent holes are generally positioned at the base end of adjacent triangular structures to enable trapped air and water to pass through the vent holes and reduce pressures due to water/wave slamming. An embodiment where there are multiple concentric rings of wedge shapes presents another solution. Such an embodiment, with multiple concentric rings, may have a plurality of air vents (150A, 150B) built into the float.

Figure 7:
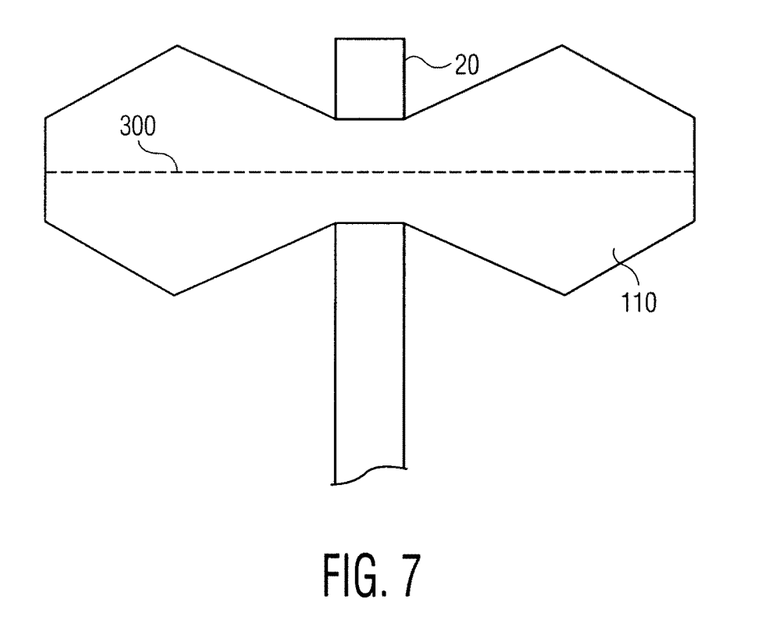
FIG. 7 is a cross-sectional diagram of another float with wedge shaped extensions above the top surface and below the underside of the float in accordance with an aspect of the invention.

FIG. 7 shows a cross-sectional diagram of a float embodying the invention with a wedge shaped formation on the upper surface of the float, above the waterplane 300. Such an embodiment of the invention may have desirable properties in situations where water is impacting on the top side of the float. Situations where water may impact the top of the float include wave breaking situations (such as if the float were to be located in shallow water where waves may break onto the float) and situations where the central spar 20 is oriented relative to the incident waves in such a manner that waves may impact on the top of the float.

In various figures the float is shown to be symmetrical (in the vertical direction) about the waterline 300. Except for conditions of the type discussed for FIG. 7, this is not a necessary or needed condition. For the general case of protecting the float from slamming events it is the underside of the float which is of primary concern. Hence, concern for the form of the float above the waterline is limited to the conditions discussed for FIG. 7.

The floats discussed above have been shown to be of toroidal shape and radially symmetric but this is not a necessary condition. The float could be of elliptical or any other suitable shape.

What is claimed is:

1. A wave energy converter (WEC) intended to be placed in a body of water subjected to wave motion of varying amplitude and frequency, said WEC including a first body tending to move generally in phase with the waves and out of phase with respect to a second body; and wherein said first body is a unitary structure which has a top surface extending rigidly and radially about a central opening along a horizontal plane generally parallel to the water plane and a rigid bottom, underside, portion appended to and depending from said top surface, said underside having a cross section shaped to form an inverted triangular structure for cutting through the underlying water and thereby reducing stresses imparted to said first body when subjected to water slamming; wherein said top surface and rigid bottom are symmetrical about the central opening; and wherein the second body extends along and through the central opening of the first body in a direction which is generally perpendicular to the surface of the water plane; and wherein the first and second body move relative to each other in response to the waves for generating energy.

2. A WEC as claimed in claim 1, wherein the first body is a float and the second body is a spar; and wherein the inverted triangular cross section has first and second sides extending below the water surface and joined at a point defining the apex of the triangular cross section and the altitude of the triangular cross section.

3. A WEC as claimed in claim 1, wherein the angles formed between the first and second sides of the triangular section and a horizontal plane, generally parallel to the still water surface, can vary between a small acute angle greater than zero degrees and ninety degrees.

4. A WEC as claimed in claim 1, wherein the first body has a predetermined thickness, H1, defining a first plane and wherein the triangular cross section extends below the first plane and the outer portion of the triangular cross section, facing away from the central opening, is shaped and angled to increase survivability while maintaining power producing capability.

5. A WEC as claimed in claim 1 wherein the top surface is of a generally toroidal configuration and wherein the triangular cross section when rotated by 360 degrees defines the underside of the first body.

6. A WEC as claimed in claim 2, wherein, in addition to the central opening, vent holes are provided between the bottom and top surfaces of the float to enable fluids trapped under the float to pass through the float.

7. A WEC as claimed in claim 2, including a space within the central opening for enabling fluids trapped under the float to escape.

8. A WEC as claimed in claim 2 wherein the triangular cross section forms at least one generally shaped triangle between the outer periphery of the float and the central opening.

9. A WEC as claimed in claim 2 wherein the triangular cross section forms more than one generally shaped triangle between the outer periphery of the float and the central opening.

10. A method of forming a float for a wave energy converter (WEC) having improved survivability and power producing characteristics, comprising the steps of:
    forming the float to have a first body designed to move generally in phase with the waves; wherein said first body is a unitary structure which has a top rigid surface extending radially about a central opening along a horizontal plane generally parallel to the water plane; wherein said top surface and rigid bottom are symmetrical about the central opening; and
    shaping the bottom, underside, portion of the first body to have a cross section defining a rigid inverted triangular structure for cutting through the underlying waves and thereby reducing stresses imparted to said first body when subjected to water slamming.

11. A method as claimed in claim 10 wherein the inverted triangular cross section has first and second sides extending below the water surface and joined at a point defining the apex of the triangular cross section and the altitude of the triangular cross section.

12. A method as claimed in claim 11, including the step of selecting the angles formed between the first and second sides of the triangular section and a horizontal plane, generally parallel to the still water surface.

13. A method as claimed in claim 12, including the step of;
    (a) defining a thickness H1 extending from the top surface of the float;
    (b) forming the triangular cross section below H1, and
    (c) shaping and angling the outer portion of the triangular cross section, facing away from the central opening, to decrease impacting stresses so as to increase survivability while maintaining power producing capability.

14. A wave energy converter (WEC) intended to be placed in a body of water subjected to wave motion of varying amplitude and frequency, said WEC including a first body tending to move generally in phase with the waves wherein said first body is subject to wave slamming forces and a second body intended to move generally out of phase with respect to the first body; and
    wherein said first body is formed to withstand the adverse effect of the wave slamming forces, said first body is a unitary structure which is shaped to have an annular ring, extending rigidly and radially about a central opening along a horizontal plane generally parallel to the water plane and having a rigid bottom, underside, portion appended to and depending from said annular ring whose cross section defines an inverted triangular region extending between the central opening and the outer perimeter of the annular ring, with the outer perimeter being symmetrical with respect to the central opening.

15. A WEC as claimed in claim 14 wherein the first body is a float and wherein the triangular region defines a structure for cutting through the water while providing substantial buoyant force response for small waves.

16. A WEC as claimed in claim 15 wherein the underside of the float, intended to be impacted by the waves, is wedge shaped, being triangular in cross section with the apex of the triangle pointing away from the top surface of the float.

17. A WEC as claimed in claim 16 wherein the float is generally doughnut shaped along the horizontal direction with a wedge-shaped bottom.

18. A WEC as claimed in claim 17 wherein the cross section of the float defines a number of triangular extensions and wherein, in addition to the central opening, vent holes are formed between the underside and the top surface of the float.

* * * * *